United States Patent [19]

Gaeddert et al.

[11] 4,224,867
[45] Sep. 30, 1980

[54] CROP LOADING MONITOR FOR ROTARY BALERS

[75] Inventors: Melvin V. Gaeddert; Rex O. Weigand, both of Newton, Kans.

[73] Assignee: Hesston Corporation, Hesston, Kans.

[21] Appl. No.: 22,445

[22] Filed: Mar. 21, 1979

[51] Int. Cl.³ .................... B30B 5/06; A01D 39/00; B30B 15/00
[52] U.S. Cl. .................................. 100/88; 56/341; 100/99
[58] Field of Search ............... 100/88, 89, 99; 56/341, 56/342, 343

[56] References Cited

U.S. PATENT DOCUMENTS

| 3,722,197 | 3/1973 | Vermeer | 100/88 X |
| 3,895,573 | 7/1975 | Phillips | 100/88 |
| 4,182,101 | 1/1980 | Gaeddert | 100/88 |

FOREIGN PATENT DOCUMENTS 625855 8/1961 Canada ..................................... 100/99

Primary Examiner—Edward J. McCarthy
Attorney, Agent, or Firm—Schmidt, Johnson, Hovey & Williams

[57] ABSTRACT

In the event that crop material is loaded into the baling chamber more heavily in one portion than another, the forming belt at the area of insufficient volume will become slackened relative to the remaining belts. Such slack condition is sensed by the monitor, and a signal device such as a light, buzzer or bell is actuated to indicate to the operator that additional crop material is needed in the deficient portion of the chamber so as to prevent the bale from becoming improperly shaped. The operator can thereupon take steps to assure that material is loaded in such a way as to make up for the deficiency.

7 Claims, 4 Drawing Figures 4,224,867

CROP LOADING MONITOR FOR ROTARY BALERS

TECHNICAL FIELD

This invention relates to the field of rotary balers, particularly that type of rotary baler capable of producing large, so-called "round" bales normally weighing 1000 to 2000 pounds.

BACKGROUND ART

As a typical rotary baler is driven along a crop windrow and crop material is continuously picked up and loaded into the baling chamber of the machine, the situation frequently arises in which the baling chamber is not loaded uniformly from one axial end thereof to the opposite end thereof. This is due largely because of the relatively narrow width of windrows compared to the overall length of the baling chamber, and unless the operator skillfully weaves his way along the windrow, the center of the baling chamber will necessarily become more heavily loaded than its opposite ends. This results in a bale which may be highly dense and fat in the middle but less dense and smaller diameter at its opposite ends.

SUMMARY OF THE PRESENT INVENTION

The primary objective of the present invention is to provide the operator of the baler with a signal in the event that the bale is not being properly shaped so that the operator can immediately rectify the problem by loading additional material into the deficient area. Pursuant to this objective, a pair of belt-tension sensors are provided in association with those tensioning belts of the baler that correspond to opposite ends of the bale being formed. When the tension of either of such belts decreases relative to the other belts as a result of insufficient crop material at that particular end of the bale, the appropriate sensor will close a switch which in turn will energize an electrical circuit to actuate a signal device such as in the form of a light. Two such signal devices are employed, one for each end of the bale, and depending upon which device is actuated, the operator may thereupon take corrective measures for that particular end of the bale.

DETAILED DESCRIPTION

Figure 1:
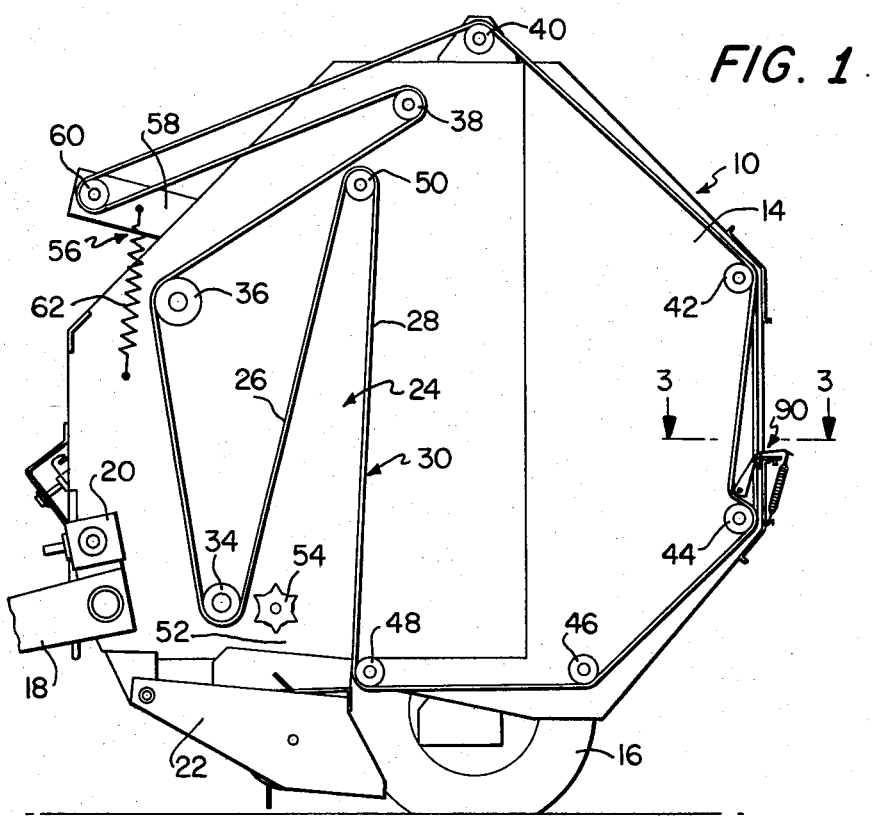
FIG. 1 is a schematic, side elevational illustration of a rotary baler with the near sidewall thereof removed to reveal mechanism within the baler, such baler incorporating a crop-loading monitor constructed in accordance with the principles of the present invention.
Figure 3:
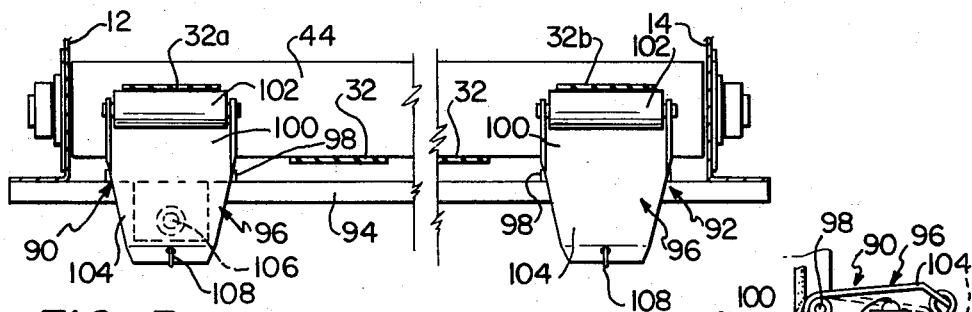
FIG. 3 is an enlarged, fragmentary, cross-sectional view through the rear of the baler taken substantially along line 3—3 of FIG. 1 and illustrating the sensors of the monitor from a different vantage point.

The baler 10 includes a pair of laterally spaced apart sidewalls 12 and 14 carried by ground wheels 16 (only one being shown) for advancement across a field in response to pulling force applied to a generally fore-and-aft extending tongue 18 at the front of the sidewalls 12,14. A right-angle gear box 20 mounted on top of the tongue 18 is adapted to receive driving input power from a suitable drive line (not shown) which in turn is normally connected to the power-takeoff shaft of the towing vehicle, the gear box 20 thereby supplying driving power to the various moving components of the baler 10 including the crop pickup 22 thereof which may be of conventional design.

Because the sidewalls 12 and 14 are indeed laterally spaced apart with respect to the normal path of travel of the baler 10, room is provided therebetween for the formation and transport of a bale of crop material formed by that material which is picked up and loaded into the space between the walls 12,14 by pickup 22. Hence, the sidewalls 12 and 14 cooperate to in part define a baling chamber broadly denoted by the numeral 24, the opposite ends of which are defined by the sidewalls 12 and 14. The fore-and-aft limitations of the chamber 24 are defined by opposed, initially generally vertically disposed stretches 26 and 28 of endless, flexible web means broadly denoted by the numeral 30 and preferably comprising a series of endless, side-by-side, flexible rubber belt elements 32 having their respective longitudinal axes disposed in a plane parallel to the sidewalls 12,14.

The endless belts 32 are looped around a number of cylindrical rolls spanning the distance between the sidewalls 12 and 14. For example, roll 34 adjacent the lower front end of the chamber 24 may be driven by the output from gear box 20 so as to provide motive force for driving the belts 32 longitudinally of themselves, and, proceeding clockwise around the baler as viewed in FIG. 1, the other rolls may be idlers including the roll 36, the roll 38, the roll 40, the roll 42, the roll 44, the roll 46, the roll 48 at the lower rear end of the chamber 24, and the roll 50 defining the upper limit of the chamber 24 and serving also to hold the stretches 26 and 28 in substantially upright dispositions at the initiation of a baling cycle. Roll 34 is driven in a clockwise direction such that the front stretch 26 moves downwardly while the rear stretch 28 moves upwardly. It should also be pointed out that the bottom of the chamber 24 is open such as to present a crop inlet 52 from the pickup 22, and a special roll 54 situated just rearwardly of the drive roll 34 and provided with a ribbed periphery may be utilized if desired to assist in positioning and driving the bale within the chamber 24, the roll 54 likewise being driven in a clockwise direction viewing FIG. 1.

The dimensions of the chamber 24 increase in a fore-and-aft direction during bale growth as the front and rear stretches 26 bow out in respective fore-and-aft directions to accommodate growth of a bale rolling up within the chamber 24 under the driving force of the stretches 26,28 as additional crop material is continuously loaded up into the chamber 24 via the inlet 52. The stretches 26 and 28 thus must lengthen as they circumscribe the growing bale of progressively increasing circumference, yet at the same time it is important that the stretches 26 and 28 maintain a compactive force against the forming bale in order to properly densify the same as it forms and to assure that the stretches 26 and 28 actually drive the bale instead of simply slipping along the surface thereof. Accordingly, suitable slack takeup and tensioning mechanism broadly denoted by the numeral 56 is provided, and such mechanism 56 may take the form, for example, of generally vertically swingable arm structure 58 provided with an idler roll 60 about which the belts 52 are looped in the manner illustrated in FIG. 1. The arm structure 58 is yieldably biased downwardly by spring means 62, and by virtue of this arrangement, the arm structure 58 can swing upwardly under resistance by the spring means 62 so as to pay out the additional lengths needed by the stretches 26,28 to accommodate the growing bale, yet such stretches 26,28 remain adequately tensioned to compact and drive the bale.

Figure 4:
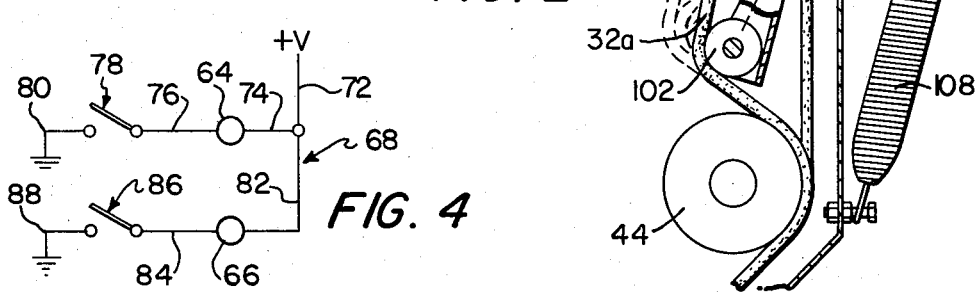
FIG. 4 is a schematic, wiring diagram of the circuit forming a part of the crop-loading monitor of the present invention.

Pursuant to the present invention, the baler 10 is provided with a crop-loading monitor including signal means which may take the form, for example, of a pair of lights 64 and 66 illustrated in the schematic diagram of FIG. 4. The lights 64 and 66 are desirably positioned where they may be easily seen by the operator, for example, in the cab of the towing vehicle. One light 64 is provided for one end of the bale being formed, while the other light 66 is provided for the opposite end of the bale being formed, and the lights 64,66 are disposed in an electrically parallel arrangement as part of an electric circuit denoted broadly by the numeral 68 in FIG. 4. As illustrated, other parts of the circuit 68 include a source of electrical potential 70, such as the electrical storage battery of the towing vehicle, a lead 72 from the source 70 and common to both of the lights 64,66, a lead 74 connecting the light 64 with the lead 72, a lead 76 connecting the light 64 with a single pole switch 78, and a lead 80 connecting the switch 78 with ground negative. Thus, when the switch 78 is closed, a completed circuit path formed by the lead 72 lead 74, light 64, lead 76, switch 78, and lead 80 is formed to actuate the light 64.

Similarly, a lead 82 connects the light 66 with the lead 72, while another lead 84 connects the light 66 with a switch 86, the switch 86 in turn being connected to ground negative by a lead 88. Thus, when the switch 86 is closed, a circuit path is completed comprising the lead 72, the lead 82, the light 66, the lead 84, the switch 86, and the lead 88 so as to actuate the light 66.

The monitor further includes apparatus for actuating the signal lights 64 and 66 at the proper times, such apparatus including a pair of sensors 90 and 92 at the rear of the baler 10 and mounted on a cross support 94 spanning the distance between the sidewalls 12,14. The sensors 90,92 are positioned for operable associating with respective ones of the endmost belts 32a and 32b in the series of belts 32 spanning the distance between the sidewalls 12 and 14.

Figure 2:
FIG. 2 is an enlarged, fragmentary, detail view of one of the sensors of the monitor showing the way in which it is movable between circuit opening and circuit closing positions thereof depending upon the tension in the proximal belt.

The sensors 90 and 92 are of identical construction, and thus only the sensor 90 will be described in detail. As illustrated in FIG. 2, the sensor 90 includes a lever member 96 having a horizontal pivot 98 located between the opposite ends thereof and carried by the cross support 94. One down-turned and inwardly extending leg 100 of the member 96 carries a transversely extending roller 102 at its lower end which is disposed for engagement with the proximal belt 32a at a location just above the transverse roll 44. The other inwardly extending leg 104 of the member 96 is located in overlying relationship to a contact 106 and is yieldably biased downwardly toward engagement with the contact 106 by a tension spring 108 connected between the outermost end of the leg 104 and a proximal portion of the baler 10. The member 96 is grounded to the frame of the baler 10 (as illustrated conceptually by the lead 80 in FIG. 4), while the contact 106 is electrically insulated from the baler frame and from the member 96 except in the area of the arm 104 when there is contacting engagement between such two structures as illustrated in dotted lines in FIG. 2. Contact 106 is, however, connected to the light 64 and the source of electrical potential 70 as illustrated in FIG. 4, and thus the arm 104 and the contact 106 serve as the switch 78 of FIG. 4.

OPERATION

Normally, the tension in the endmost belts 32a and 32b is sufficient to overcome the force of springs 108 so as to keep the arms 104 of sensors 90,92 raised off their corresponding contacts 106, to the end that both circuit paths to the lights 64 and 66 remain open and interrupted as illustrated in FIG. 4. Consequently, the signal lights 64,66 are normally both off. So long as the end belts 32a and 32b are tensioned to the same extent as the remaining belts 32 throughout bale growth, legs 104 will remain out of engagement with the contacts 106, and the lights 64,66 will remain unlit.

However, if crop material begins to accumulate more heavily in one end of the chamber than the other because, for example, the operator is driving asymmetrically down the windrow, then the belts adjacent the end of the bale receiving less material will become slackened relative to the other belts. This is due to the fact that all of the belts are tensioned by the common roll 60 which will pay out additional length any time the force of spring 62 is overcome. Thus, when too much material enters one end of the bale chamber 24 relative to the opposite end, that excessive amount of material will force the arm structure 58 to swing upwardly against the resistance of spring 62 in order to pay out sufficient length to accommodate the additional material. By the same token, however, such movement also pays out additional unneeded length to the belts associated with the smaller volume of material such that they become slackened relative to the other belts. Accordingly, as illustrated in FIG. 2 with respect to the sensor 90, when the end belt 32a becomes slackened to its dotted line position, the member 96 swings about pivot 98 in a clockwise direction so that leg 104 is brought into engagement with contact 106, thereby closing the switch 78, completing the electrical circuit path to the light 64, and energizing the latter to alert the operator.

As soon as the operator notices that the light 64 has indeed flashed on, he may immediately take corrective means to load a relatively disproportionate amount of new material into the deficient end of the bale chamber 24 so as to equalize the volume of material within the chamber 24 from one end to the other and thereby correspondingly provide the forming bale with a uniform cross-sectional diameter from end to the other thereof.

As the volume of material becomes equalized end-to-end of the chamber 24, the particular sensor 90 or 92 that has been actuated will thereupon become returned to its standby condition as the tension in its respective end belt 32a or 32b rises up to that level of the other belts 32. As such tension increases, the affected belt, such as the belt 32a in FIG. 2, returns back to its solid line position, thereby swinging the member 96 in a counterclockwise direction about its pivot 98 to lift the leg 104 off the contact 106, thereby breaking the circuit path involved and turning off the particular light 64 or 66 involved.

Manifestly, the situation may arise where both of the lights 64 and 66 come on concurrently, indicating that a disproportionate amount of material is being loaded into the middle of the baling chamber 24 relative to the opposite ends thereof. This would normally be the case if the operator simply drives down the windrow with the latter centered in the machine without weaving from side to side thereof. Pursuant to the present invention, therefore, the signal lights 64,66 are independent of one another such that either may be lighted as necessary, yet both may become lighted at the same time depending upon the manner in which the baling chamber 24 has been loaded.

It is, of course, clear from the foregoing that many changes could be made in the embodiment herein illustrated without departing from the spirit of the present invention. For example, instead of bearing directly against the endmost belts 32a and 32b, the sensors 90 and 92 could be so constructed and arranged as to be actuated by one of the rolls for the belts 32, in which event the particular "actuating" roll would be floatingly supported so as to permit relative shifting movement between its two opposite ends in response to variations in tension among the various belts controlled by the roll. Similarly, the web means 30 need not be in the form of individual belts 32, but instead could be a continuous wide, flat belt or raddle chain.

We claim:

1. In a rotary baler, a crop loading monitor comprising:
    signal means; and
    apparatus operably coupled with said signal means for actuating the same when the diameter of a bale forming in said baler becomes less at one portion thereof than another.

2. In a rotary baler as claimed in claim 1, wherein said baler includes driven web means tensioned to apply a compactive and rolling force to the bale during formation, said apparatus actuating said signal means in response to detecting variations in the force applied by the web means adjacent the middle and ends of the bale.

3. In a rotary baler as claimed in claim 1, wherein said baler includes a set of side-by-side, endless elements tensioned and driven lengthwise to apply a compactive and rolling force to the bale during formation, said apparatus including a pair of sensors positioned for operation by their respective elements adjacent opposite ends of the bale, an element adjacent the end of the bale being operable to operate its corresponding sensor when that particular element is slackened relative to the elements corresponding to the middle of the bale.

4. In a rotary baler as claimed in claim 3, wherein said signal means is electrically powered, said apparatus further including an electrical circuit associated with said signal means, the opening and closing of a path of said circuit being controlled by a said sensor.

5. In a rotary baler as claimed in claim 4, wherein each of said sensors includes a member engageable with its corresponding element and shiftable therewith to a position operating said circuit path when said corresponding element becomes slackened.

6. In a rotary baler as claimed in claim 5, wherein said signal means includes a pair of signal devices each operable independently of the other by their corresponding sensors.

7. In a rotary baler as claimed in claim 1, wherein said signal means includes a pair of signal devices corresponding to opposite ends of the bale being formed, each of said devices being operable independently of the other to signal the condition of the forming bale at the corresponding end thereof without regard to the opposite end of the bale.

* * * * *